Patented May 28, 1935

2,002,505

UNITED STATES PATENT OFFICE 2,002,505

PREPARATION OF EMULSIONS OF THERMO-PLASTIC MATERIALS

Arthur Warren Hixson, Leonia, N. J., and Jacob Mitchell Fain, Brooklyn, N. Y.

No Drawing. Application February 23, 1932, Serial No. 594,732

13 Claims. (Cl. 134—1)

This invention relates to the preparation of emulsions of thermoplastic materials and more particularly to the preparation of emulsions of bitumens which possess high suspendability and which upon drying are substantially impermeable to water, will not strip from a surface on which they are dried, and will not re-emulsify.

The principal object of this invention is to provide a process of preparing emulsions of high suspendability when in fluid condition and of substantially complete impermeability to water when in the form of dried films.

An important object of the invention is to provide a process of preparing emulsions which possess both the property of suspendability characteristic of hydrophilic dispersions and the property of impermeability to water characteristic of hydrophobic dispersions.

Other objects and advantages of the invention will become apparent during the course of the following description.

Heretofore, emulsions of thermoplastic materials, such as emulsions of the bitumen-pitch type, have been made with a variety of emulsifying agents including colloidal clays, inorganic oxids and hydroxids, soluble and insoluble silicates, alkalies, alkaline salts such as trisodium phosphate, soaps of all types and their equivalents, albuminoids, proteins both alone and in combination with alkali, pectins, gums, potassium alginate, sulphite liquors derived from alkali-cellulose manufacture, alkaline bases including pyridines, amines and the like, tannins and allied substances including tannic acid, ammonium tannate, tannins from various barks, saponin and various bark extracts, lignins, humic acid and alkaline humates, polysaccharides and hemicelluloses, sulphonated vegetable oils, derivatives of mineral oils including naphthenic acids, sulpho-derivatives, acid sludges, oxidation products and the like, glycerine residues obtained on distillation, and molasses residues combined with lime.

Commercial emulsions made with the emulsifying agents set forth above are of two classes:— they are either (a) suspendable at the viscosities or consistencies at which they are used, or (b) they are not, i. e. upon standing they settle leaving water or a more dilute suspension on top and a heavier, more concentrated emulsion at the bottom. From a commercial point of view, the suspendable emulsions are much more desirable than those of the other class. However, with this property of suspendability possessed by the first class of emulsions, there has heretofore always been associated the property of the emulsion film, after ordinary drying under atmospheric conditions, of re-emulsifying or at least stripping from a slide on immersion in water. When employed as protective coatings which are exposed to water, salt solutions or other aqueous media, they are attacked, as a result of which they fail of their purpose of protecting or bonding materials. While certain of the nonsuspending emulsions, notably those made with china clays, which are of relatively low colloidal value or emulsifying power, and inorganic oxids and hydroxids, give dried films which on immersion in water do not strip or re-emulsify, these emulsions are not commercially desirable because of their settling characteristics referred to above.

The reason for the association of the properties of suspendability of a suspendable type emulsion at useable consistency with re-emulsification of the dried film and of non-suspendability of an emulsion of the second class at useable consistency with impermeability to water of the dried film is quite clear. Emulsions of the suspendable type are made with emulsifying agents which are characterized by the name "hydrophilic colloids" and the dispersions prepared with such emulsifying agents are termed "hydrophilic dispersions". Examples of "hydrophilic" emulsifying agents are bentonite, gums, proteins and soaps. While this type of emulsifying agent will produce a suspendable emulsion, it is likewise a property of these agents that when dried they re-disperse in water. This accounts for the re-emulsification of a dried film obtained from a suspendable emulsion. Although it is sometimes claimed that, upon drying, the dispersing agent is completely absorbed within the dried mass of protective substance, it has been shown that this is not the case. Even after weeks and months of drying, a considerable proportion of the emulsifying agents will be found separating particles of the originally dispersed substance, and the film becomes permeable to water upon immersion therein.

Emulsifying agents of the second class, such as china clay, which has relatively low colloidal value, and inorganic oxids and hydroxids, provide emulsions, often termed "hydrophobic dispersions", which when dried will not re-disperse in water and which provide films which are impermeable to water. However, these emulsifying agents are precipitated by small concentrations of electrolytes and are not capable of maintaining in suspension particles of thermoplastic material, such as asphalt.

Efforts have been made to treat suspendable emulsions so that their films will show greater water-resistance. However, these efforts have heretofore always resulted in a diminution of suspendability of the emulsions. Moreover, attempts have been made to render emulsions which give a water-resistant film more suspendable at commercially useable consistencies, but these attempts have always resulted in rendering the films more permeable to water. By the term "commercially useable consistencies" is meant, in the case of emulsions of thermoplastic materials, such as bituminous emulsions, the consistencies of emulsions having water contents ranging from 25 per cent. to 55 per cent.

As shown in United States Patent No. 1,733,498, the attempt has been made to improve the water-resistance of the dried film of a suspendable emulsion by adding mineral acids or alkaline earth oxids and hydroxids to an emulsion of asphalt and water made with bentonite clay as emulsifying agent and containing in addition a protective colloid. While the addition of these materials improves the water-resistances of the dried film, the emulsion produced according to this treatment is not commercially satisfactory because the emulsion ceases to be sufficiently suspendable. Another attempt to produce a suspendable emulsion which provides an impermeable film, as described in United States Patent No. 1,783,366, which discloses the manufacture of an asphalt emulsion by means of an intimate mechanical mixture of clay and gelatinous aluminum hydrate with the purpose in view of obtaining a water-resistant film without impracticably long drying. The emulsion produced by this treatment is still not satisfactorily suspendable and the proportions of clay and gelatinous aluminum hydrate which give the desired property of water-impermeability to the dried film are so high with respect to the bitumen in the emulsion as to make this method disadvantageous from the standpoint of cost. Moreover, considerably more mechanical power must be expended for the dispersion of a given amount of asphalt by this process as compared to other processes, ours in particular.

As a result of extensive experiments we have discovered a method by which there may be combined in a single emulsion of thermoplastic material both the properties of suspendability of the emulsion and impermeability of the dried film. In its broad aspect, our process consists in forming a hydrophilic dispersion with a hydrophilic colloid and transforming such colloid to a unique colloidal material which possesses the desirable properties of being stable to high concentrations of electrolytes while existing as a sol, and of becoming irreversible when dried out. The effect of the presence of this unique colloidal material is to render the emulsion suspendable and the film impermeable to water without impracticably long drying.

In the practice of our process a thermoplastic material, such as paraffin, earth waxes and bitumens, and particularly a bituminous thermoplastic such as asphalt, pitch or tar, is emulsified with a hydrophilic colloid which may be soap, for example. To the resulting emulsion is added a protective colloid, notably a protein, and also a tanning material which is preferably tannin but which may be other tanning material such as tannic acid, synthetic tanning agents or the like. As will be apparent, the protective colloid and the tanning material will be carried in solution in the aqueous phase of the emulsion. At this point, the emulsion will be of suspendable type and possess the properties of this class of emulsions. However, by reacting upon the tanning material or the compound or complex of the tanning material and protective colloid to form a sol which is stable to electrolytes and impermeable when dried out, the resulting emulsion will retain its former properties of suspendability while acquiring the characteristic properties of the second class of emulsions, i. e. the emulsion will not re-emulsify when dried, will not strip from a surface, and is substantially completely impermeable to water. In preferred practice, this result is obtained by transforming the tanning material to a metal salt of the tanning material which will exist as a sol. For example, where tannin is used we prefer to add a solution of a heavy metal salt and convert the tannin to a heavy metal tannate, which material is produced as a sol which is extremely stable to high concentrations of electrolytes and becomes irreversible upon drying.

In the specific practice of our process, wherein a bitumen preferably is treated, an emulsion is first made by heating the bitumen to a temperature at which it is readily fluid and pouring it into a hot solution of an emulsifying agent such as soap, protein or the like, rapid agitation being maintained during the mixing operation. Ordinarily, the materials will be mixed in a vessel provided with a mechanical stirrer or agitator. However, the bitumen and aqueous solution of the emulsifying agent may be poured concurrently into a high speed colloid mill, if desired. The character of the solution to be employed as the emulsifying agent will depend upon the nature of the thermoplastic material to be emulsified. For example, some bitumens such as Mexican asphalt, certain tars, etc., contain saponifiable ingredients so that all that is necessary for the preparation of the initial emulsion is to mix a solution of alkali with the material under treatment, the saponaceous reaction product serving as a hydrophilic emulsifying agent. In other cases, it will be necessary to add a material which is itself an emulsifying agent, such as soap, protein or the like.

In order to protect the emulsion while the change from one colloid to another takes place, it is necessary to add a protective colloid, such as a protein. Of course, if a protein or other protective colloid is employed initially as the hydrophilic emulsifying agent, it will not be necessary to add this material again. To the thus prepared emulsion which contains thermoplastic material in the dispersed phase and a protective colloid in the aqueous phase, is added a tanning material, preferably tannin, either in dry form or in solution. The tanning material is preferably added at this point but this is not necessary since it may have been initially added so as to be present with the original emulsifying solution such as a solution of alkali, soap, protein, or the like. The thus prepared suspendable emulsion is now ready for transformation into the new type of emulsion which we have developed. This transformation is accomplished by stirring into the emulsion a soluble metal salt which is capable of insolubilizing the protein present and converting the tanning material to a metal salt sol which is stable to electrolytes and irreversible when dried out. Numerous soluble metal salts may be used for this purpose and among those which are suitable may be mentioned salts of iron, cobalt, manganese, nickel, zinc, etc.

We have found that the best results are obtained by the use of ferrous sulphate heptahydrate and its use is recommended.

When the soluble metal salt solution is stirred into the emulsion, the emulsion is not broken nor made grainy. Tests show that over 90 per cent. of the thermoplastic material is still in the form of particles ranging from 1 to 10 microns in diameter. Moreover, the emulsion is still as stable and suspendable as before. There is, however, an important difference in the resulting emulsion, viz. a dried film of the emulsion on continued immersion in water adheres as tenaciously to the surface to which it is applied as the original thermoplastic material, and its ductility is likewise as great. Without the addition of the metal salt solution to the emulsion, however, the dried film under a similar immersion test, strips off the surface to which it has been applied or completely re-emulsifies.

The change which has been effected may be appreciated by starting with a picture of a particle of bitumen in water, having attached to its surface a soap molecule. The accepted viewpoint of the present day is to regard the soap molecule as being oriented with its polar group sticking out into the water and its non-polar group penetrating into the bitumen. The protein which serves to protect the emulsion during the transformation period is adsorbed as an envelope about the bitumen particle, according to one school of thought, or is chemically attached to the soap, according to another school of thought. The tannin present is either free in solution or attached to the protein in the form of a protein-tannate combination. While protein-tannates are relatively insoluble in water at high concentrations, the solubility of such compounds or complexes is maintained in the relatively low concentration encountered in the present process, particularly in alkaline solutions. This may be demonstrated in aqueous solutions. It is likewise proved by the fact that at this point the emulsion is suspendable and stable to the addition of electrolytes, a condition which would not exist if the protein had been precipitated. Moreover, the dried film of such an emulsion likewise re-emulsifies on immersion in water. The addition of the soluble metal salt causes a reaction with the tannin existing free in solution or in combination with the protein to form a colloidal metal tannate which is stable in the presence of electrolytes and is not precipitated by excess of the metal salt. The metal salt also reacts with the protein and with the soap to form compounds insoluble in water. The emulsion thus prepared is now entirely stabilized by the adsorption at the surface of the bitumen particles of the metal tannate sol which has the unique properties of being very stable in the presence of electrolytes and of becoming irreversible when dried out.

The picture is not substantially changed when protein, alone or in alkaline solution, without soap, is used in the original emulsifying solution. Now the protein is concentrated directly at the surface of the bitumen particle with polar groups sticking into the water and non-polar groups penetrating into the bitumen. The tannin is again free in solution or combined with the protein in a protein-tannate combination. The addition of the soluble metal salt causes a reaction with the tannin, a metal tannate sol being formed which serves to protect the emulsion. The protein is rendered insoluble by the formation of a metal proteinate.

The following specific example of the process may be considered as illustrative of the invention:

Two hundred and fifty parts of a solution containing 0.5 per cent. of tannin and 0.6 per cent. of potassium hydroxid are heated almost to boiling. Five hundred parts by weight of Mexican asphalt heated to a temperature somewhat above 100° C. are added to the tannin-alkali solution, mixing being effected by a mechanical stirrer. The emulsion is permitted to cool and fifty parts by weight of an alkaline 6.4 per cent. casein solution are stirred in. The proportion by weight of casein in the emulsion is thus 0.4 per cent. Twenty parts of a 10 per cent. ferrous sulphate heptahydrate solution are then added. The proportion by weight of ferrous sulphate heptahydrate in the emulsion is thus about 0.25 per cent.

As will be apparent more or less of any of the above chemical substances may be used without substantially effecting the final product. The tannin content may be reduced from 0.16 per cent. in the emulsion as described above to 0.03 per cent. It may likewise be increased to any reasonable amount. The ferrous sulphate heptahydrate content may not be much reduced if the above stated casein content is maintained, without sacrificing the impermeability to water of the dried film. It may however, be considerably increased. The quantities of water above used give solutions of convenient concentrations, but more or less may be used to give solutions of different concentrations without important effect on the finished product.

The following table illustrates the effect of adding the ferrous sulphate heptahydrate to emulsions made with and without tannin. The emulsions were made in an identical manner by stirring hot Mexican asphalt into hot alkaline solutions and subsequently adding casein to the emulsions formed. In the one case no tannin was present in the original alkaline solution. In the other case the solution contained 0.5 per cent. tannin. Additions of varying quantities of a 10 per cent. ferrous sulphate heptahydrate solution were made to 50 gram portions of each emulsion and water was added to bring the total volume to 100 cc. The emulsions were screened through 40 mesh screens and the weight of the deposit gives a measure of the breaking of the emulsion.

| 10 percent. $FeSO_4 \cdot 7H_2O$ solution | No tannin | | 0.5% tannin | |
| --- | --- | --- | --- | --- |
| | Weight of deposit | Proportion of deposit to emulsion | Weight of deposit | Proportion of deposit to emulsion |
| cc. | Grams | Per cent. | Grams | Per cent. |
| 0 | 0.0213 | .04 | 0.0262 | .05 |
| 2 | 1.8199 | 3.64 | 0.0249 | .05 |
| 4 | 1.6762 | 3.35 | 0.0481 | .10 |
| 6 | 1.7049 | 3.41 | 0.0463 | .09 |
| 8 | 1.5553 | 3.11 | 0.0478 | .10 |
| 10 | 1.8352 | 3.67 | 0.0554 | .11 |

With no tannin present in the emulsion the addition of a soluble metal salt, such as ferrous sulphate heptahydrate, precipitates the protein and breaks the emulsion. If both a protein, such as casein, and soap are present both of these compounds are irreversibly precipitated and the dried film of this material neither re-emulsifies nor strips from the surface to which it has been applied on immersion in water. However, the material is in grainy and broken condition and is not a commercial product.

When the tannin content of the emulsion is as shown in the above table, the addition of a soluble metal salt, such as ferrous sulphate heptahydrate solution, has practically no effect on the particle size of the emulsion. The casein and the soap are insolubilized as before, but the metal tannate sol, formed in situ, stabilizes and protects the emulsion. The emulsion is stable in the presence of acidic and basic electrolytes. The iron tannate sol which is formed in the preferred practice of the invention, having once dried out, changes character and cannot be peptized by the addition of water. Thus, a film of the emulsion having dried out will not re-emulsify when immersed in water and will adhere to a surface to which it is appplied as tenaciously as the original thermoplastic material.

The addition of a soluble metal salt solution to an emulsion made as above which contains tannin, but no protective colloid such as protein, completely breaks the emulsion. Hence, it is apparent that it is the combination of tannin or other tanning material and protein or other protective colloid which gives the unusual results described above.

We are aware that certain features of our process have been employed in prior processes. For example, United States Patents Nos. 1,440,355 and 1,440,356, granted December 26, 1922, to J. C. Morell, describe the emulsification of heavy coal tar oil with a solution of tannic acid and ammonium hydroxid. British Patent No. 246,907, of November 3, 1924, issued to Asphalt Cold Mix Ltd. and F. Levy, describes an emulsion of Mexican asphalt or other bituminous material with up to 10 per cent. of an emulsifying agent comprising tannic acid or a synthetic tanning substance and hot water with or without a dilute aqueous alkali solution. Finally, United States Patent No. 1,010,210, granted November 28, 1911, to K. L. V. Zimmer, and United States Patent No. 1,700,581, granted January 29, 1929, to W. E. Billinghame, describe the manufacture of a bituminous emulsion with a soap and soluble protein. However, all of these emulsions are stabilized by hydrophilic colloids which are reversible when dried out under atmospheric conditions and in no instance is the hydrophilic colloid transformed by the addition of a metal salt to a sol which is at once stable and irreversible when dried out, as in our present invention.

While we have described in detail the preferred practice of our process it is to be understood that the details of procedure may be considerably modified without departing from the spirit of the invention or the scope of the subjoined claims.

We claim:

1. The process of stabilizing a hydrophilic dispersion of thermoplastic material which comprises incorporating therewith tannin material and a protective colloid capable of being precipitated by a heavy metal salt, and mixing a heavy metal salt with said dispersion to precipitate said protective colloid and convert said tannin material to a heavy metal tannate sol.

2. The process of stabilizing a hydrophilic dispersion of thermoplastic material which comprises incorporating therewith tannin material and a protective colloid comprising a protein, and mixing a heavy metal salt with said dispersion to precipitate said protein and convert said tannin material to a heavy metal tannate sol.

3. The process of stabilizing a hydrophilic dispersion of a bitumen, such as asphalt, tar, pitch and the like, which comprises incorporating therewith tannin material and a protective colloid comprising a protein, and mixing a solution of a heavy metal salt with said dispersion to precipitate said protective colloid and convert said tannin material to a heavy metal tannate sol.

4. The process of preparing emulsions of thermoplastic material which possess a high degree of suspendability and which will not strip from a surface or re-emulsify when dried, which comprises preparing a dispersion containing the thermoplastic material, a protective colloid, and tannin material, and transforming the tannin material to a metal tannate sol which is stable and is irreversible when dried.

5. The process of preparing emulsions of thermoplastic material which possess a high degree of suspendability and which will not strip from a surface or re-emulsify when dried, which comprises preparing a dispersion containing the thermoplastic material, a protein, and tannin material, and transforming the tannin material to a metal tannate sol which is stable and is irreversible when dried.

6. The process of preparing emulsions of bitumens such as asphalt, tar, pitch and the like, which possess a high degree of suspendability and which will not strip from a surface or re-emulsify when dried, which comprises preparing an emulsion containing the bitumen under treatment, a protective colloid capable of being insolubilized by a heavy metal salt, and tannin material, and mixing a heavy metal salt with said emulsion.

7. The process of preparing emulsions of bitumens such as asphalt, tar, pitch and the like, which possess a high degree of suspendability and which will not strip from a surface or re-emulsify when dried, which comprises dispersing the bitumen under treatment in the form of an emulsion containing a protective colloid capable of being precipitated by a heavy metal salt, and tannin material, in solution in the aqueous phase, and mixing a heavy metal salt with said emulsion.

8. The process of preparing emulsions of bitumens such as asphalt, tar, pitch and the like, which possess a high degree of suspendability and which will not strip from a surface or re-emulsify when dried, which comprises preparing an emulsion containing the bitumen under treatment, a protein and tannin, and adding a heavy metal salt to said emulsion.

9. The process of preparing emulsions of bitumens such as asphalt, tar, pitch and the like, which possess a high degree of suspendability and which will not strip from a surface or re-emulsify when dried, which comprises dispersing the bitumen under treatment in the form of an emulsion containing in solution in the aqueous phase a protective colloid capable of being precipitated by a heavy metal salt and tannin, and precipitating said protective colloid and converting the tannin to a metal tannate sol.

10. The process of preparing emulsions of bitumens such as asphalt, tar, pitch and the like, which possess a high degree of suspendability and which will not strip from a surface or re-emulsify when dried, which comprises preparing an emulsion containing in dispersed form the bitumen under treatment and containing in the aqueous phase a protein and tannin, and converting the protein to an insoluble proteinate and the tannin to a metal tannate sol.

11. The process of preparing emulsions of bitumens such as asphalt, tar, pitch and the like, which possess a high degree of suspendability and which will not strip from a surface or re-emulsify when dried, which comprises emulsifying the bitumen under treatment with an alkaline solution of tannin material, mixing with said emulsion a protective colloid capable of being precipitated by a heavy metal salt, and adding a heavy metal salt solution to the resulting emulsion.

12. The process of preparing emulsions of bitumens such as asphalt, tar, pitch and the like, which possess a high degree of suspendability and which will not strip from a surface or re-emulsify when dried, which comprises preparing an emulsion of the bitumen under treatment, with tannin and a protein in solution in the aqueous phase of the emulsion, and adding a solution of a heavy metal salt to precipitate the protein as an insoluble proteinate and to convert the tannin to a metal tannate sol which is stable and is irreversible when dry.

13. An emulsion of thermoplastic material containing a precipitated proteinate and stabilized with a heavy metal tannate sol.

ARTHUR WARREN HIXSON.
JACOB MITCHELL FAIN.